United States Patent
Bae (10) Patent No.: US 9,806,550 B2
(45) Date of Patent: Oct. 31, 2017

(54) LOAD CURRENT REGENERATING CIRCUIT AND ELECTRICAL DEVICE HAVING LOAD CURRENT REGENERATING CIRCUIT

(71) Applicant: Youn-soo Bae, Suwon-si (KR)

(72) Inventor: Youn-soo Bae, Suwon-si (KR)

( * ) Notice: Subject to any disclaimer, the term of this patent is extended or adjusted under 35 U.S.C. 154(b) by 336 days.

(21) Appl. No.: 14/432,481

(22) PCT Filed: Oct. 23, 2013

(86) PCT No.: PCT/KR2013/009469
§ 371 (c)(1),
(2) Date: Mar. 31, 2015

(87) PCT Pub. No.: WO2014/069835
PCT Pub. Date: May 8, 2014

(65) Prior Publication Data
US 2015/0263558 A1 Sep. 17, 2015

(30) Foreign Application Priority Data

Oct. 30, 2012 (KR) .................. 10-2012-0121330
Feb. 22, 2013 (KR) .................. 10-2013-0019330

(51) Int. Cl.
*H02J 7/04* (2006.01)
*H02J 1/10* (2006.01)
(Continued)

(52) U.S. Cl.
CPC .......... *H02J 7/0054* (2013.01); *H02J 7/0024* (2013.01); *H02J 7/04* (2013.01); *H02J 7/1423* (2013.01); *H02J 7/345* (2013.01); *Y10T 307/313* (2015.04)

(58) Field of Classification Search
CPC .......... H02J 7/0024; H02J 7/0054; H02J 7/04; H02J 7/1423; H02J 7/345; Y10T 307/313
(Continued)

(56) References Cited

U.S. PATENT DOCUMENTS 5,396,165 A 3/1995 Hwang et al.
8,456,874 B2 * 6/2013 Singer .................... H02M 3/07
307/109

FOREIGN PATENT DOCUMENTS

JP 07-067318 3/1995
JP 2003-299256 10/2003
(Continued)

OTHER PUBLICATIONS

English Abstract of 2009-165218.
(Continued)

*Primary Examiner* — Hal Kaplan
(74) *Attorney, Agent, or Firm* — Antonio Ha & U.S. Patent, LLC (57) ABSTRACT

A load current regenerating circuit comprises a first circuit unit having a first recharging unit recharged by a power source, a second circuit unit provided in parallel with the first circuit unit, the second circuit unit having a second recharging unit, a first switching unit opening a connection between the power source and the first circuit unit when the first recharging unit is recharged, and a second switching unit connecting the first recharging unit with the second recharging unit when the first recharging unit is recharged so that the power recharged to the first recharging unit is supplied to the second circuit unit to recharge the second recharging unit.

9 Claims, 6 Drawing Sheets (51) Int. Cl.
    *H02J 7/00*           (2006.01)
    *H02J 7/14*           (2006.01)
    *H02J 7/34*           (2006.01)

(58) Field of Classification Search
    USPC .......................................... 307/19, 109, 110
    See application file for complete search history.

(56) References Cited

FOREIGN PATENT DOCUMENTS

| | | |
|---|---|---|
| JP | 2007-104739 | 4/2007 |
| JP | 2009-165218 | 7/2009 |
| KR | 10-0970566 | 7/2010 |
| KR | 10-1069140 | 9/2011 |

OTHER PUBLICATIONS

English Specification of 07-067318.
English Abstract of 2003-299256.
English Abstract of 2007-104739.
English Specification of 10-0970566.
English Specification of 10-1069140.

* cited by examiner

LOAD CURRENT REGENERATING CIRCUIT AND ELECTRICAL DEVICE HAVING LOAD CURRENT REGENERATING CIRCUIT

TECHNICAL FIELD

The present invention relates to a load current regenerating circuit and an electrical device having the load current regenerating circuit, and more specifically, to a load current regenerating circuit that may regenerate a load current used to operate a load and voltage-converted current conducted through a converter for voltage conversion to recycle the same as an energy source, and an electrical device having the load current regenerating circuit.

DISCUSSION OF RELATED ART

Conventional energy regenerating methods include, e.g., a method in which mechanical energy is stored in, e.g., a fly wheel by motor actuation and the stored mechanical energy is converted into electric energy by a power generator and a method in which magnetic energy generated by conducting current through a magnetic circuit (e.g., a motor, transformer, or inductor) is stored in the magnetic circuit and the stored magnetic circuit is converted into electric energy while current is cut off.

Such conventional energy regenerating methods are limited by failure to regenerate the load current used to operate the load or the voltage-converted current conducted through the converter.

SUMMARY

Accordingly, the present invention aims to provide a load current regenerating circuit that may regenerate a load current used to operate a load and voltage-converted current that conducted through a converter for voltage conversion to recycle the same as an energy source, and an electrical device having the load current regenerating circuit.

To achieve the above object, according to the present invention, a load current regenerating circuit comprises: a first circuit unit having a first recharging unit recharged by a power source; a second circuit unit provided in parallel with the first circuit unit, the second circuit unit having a second recharging unit; a first switching unit opening a connection between the power source and the first circuit unit when the first recharging unit is recharged; and a second switching unit connecting the first recharging unit with the second recharging unit so that when the first recharging unit is recharged, the power recharged to the first recharging unit is supplied to the second circuit unit to recharge the second recharging unit.

Preferably, the first recharging unit includes a plurality of recharging elements connected in parallel with one another, and the load current regenerating circuit further comprises a third switching unit performing a switch so that the plurality of recharging elements are connected in series with one another when the first recharging unit is recharged.

Further, the second recharging unit includes a plurality of recharging elements, and the load current regenerating circuit further comprises a fourth switching unit performing a switch so that the plurality of recharging elements are connected in series with one another when the second recharging unit is recharged by the first recharging unit. When the second recharging unit is recharged by the first recharging unit, the third switching unit performs a switch so that the plurality of recharging elements of the first switching unit are connected in parallel with one another.

Further, the load current regenerating circuit further comprises a fifth switching unit connecting the second recharging unit with the first recharging unit when the second recharging unit is recharged by the first recharging unit so that the power recharged to the second recharging unit is supplied to the first circuit unit to recharge the first recharging unit.

Further, the load current regenerating circuit further comprises a load connected in series with each of the first circuit unit and the second circuit unit.

Further, the load current regenerating circuit further comprises an inverter or a converter connected in series with each of the first circuit unit and the second circuit unit.

Further, the load is an RL load.

Further, the load current regenerating circuit further comprises a current and voltage control circuit for keeping a current applied to the load constant.

Meanwhile, an electrical device according to the present invention includes the load current regenerating circuit.

According to the present invention, the load current used to operate the load and the voltage-converted current conducted through the converter for voltage conversion may be recycled as an energy source.

DESCRIPTION OF EXEMPLARY EMBODIMENTS

The present invention is hereinafter described in detail with the accompanying drawings. It should be noted that the same reference denotations may be used to refer to the same elements throughout the specification and the drawings. When making the gist of the present invention unclear, the detailed description of known functions or configurations is skipped.

Figure 1:
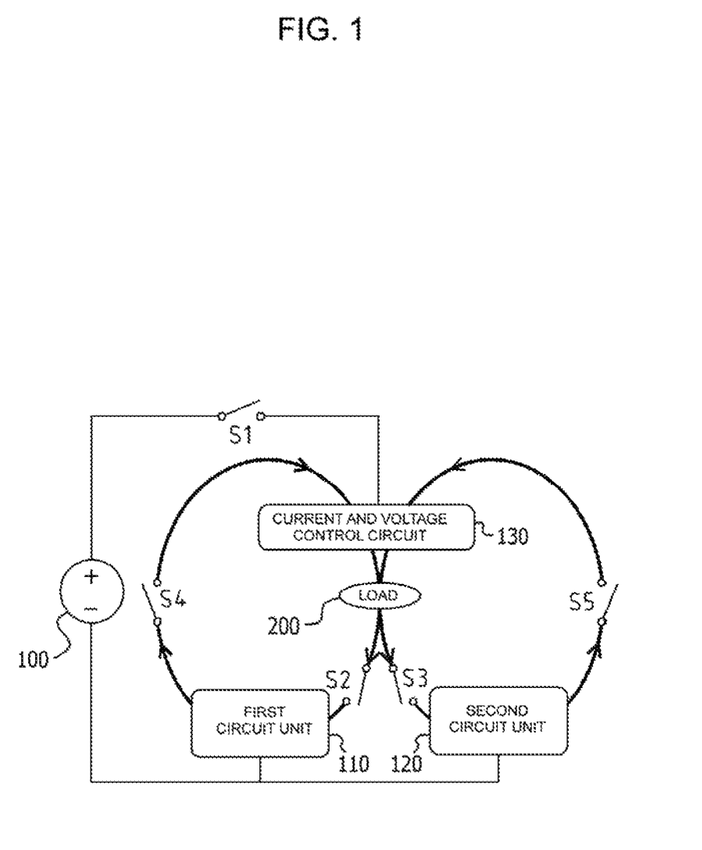
FIG. 1 is a concept view illustrating an operational principle of a load current regenerating circuit according to the present invention.

FIG. 1 is a concept view illustrating an operational principle of a load current regenerating circuit according to the present invention. The following Table 1 describes a control sequence of a load current regenerating circuit as shown in FIG. 1.

TABLE 1

| Operation mode | Mode description | Operation description | Summary |
|---|---|---|---|
| 1 | Charge-linked direct current (DC) application mode | Mode in which the load current conducted from a power source to operate a load is regeneratively recharged to a first recharging unit of a first circuit unit. | Power applied→Load operated→First circuit unit regeneratively recharged |
| 2 | Charge-linked discharge mode I | Recycling mode in which load current discharged from the first recharging unit of the first circuit unit recharged in mode 1 is regeneratively recharged to a second recharging unit of a second circuit unit. | First circuit unit discharged→Load operated→Second circuit unit regeneratively recharged |
| 3 | Charge-linked discharge mode II | Recycling mode in which load current discharged from the second recharging unit of the second circuit unit recharged in mode 2 is regeneratively recharged to the first recharging unit of the first circuit unit. | Power applied→Load operated→Second circuit unit regeneratively recharged |
| 4 | Charge-linked discharge mode III | Recycling mode in which load current discharged from the first recharging unit of the first circuit unit recharged in mode 3 is regeneratively recharged to the second recharging unit of the second circuit unit. | Second circuit unit discharged→Load operated→First circuit unit regeneratively recharged |

Referring to FIG. 1, a load current regenerating circuit according to the present invention is driven in such a manner to conduct current therethrough using an electric potential difference between the plus and minus poles of a power source 100 and a seesaw electric potential difference between plus poles. The load current regenerating circuit includes a separate controller (not shown) for controlling switches S1, S2, S3, S4, and S5, a current and voltage control circuit 130, a first circuit unit 110, and a second circuit unit 120.

Meanwhile, the load current regenerating circuit according to the present invention includes the current and voltage control circuit 130, a load 200, the first circuit unit 110, and the second circuit unit 120 between a positive terminal lead wire and a negative terminal lead wire of the power source 100, as shown in FIG. 1.

First, the current and voltage control circuit 130 controls the current applied from the power source 100 to the load 200 to be constant, and the first circuit unit 110 and the second circuit unit 120 regenerate the load current and recycles the regenerated energy.

According to the present invention, the load current regenerating circuit is fed back with the load current and voltages of the first circuit unit 110 and the second circuit unit 120 and is controlled by the controller (not shown) in the order of "operation mode 1→operation mode 2→operation mode 3→operation mode 4→operation mode 1 . . . ."

Figure 2:
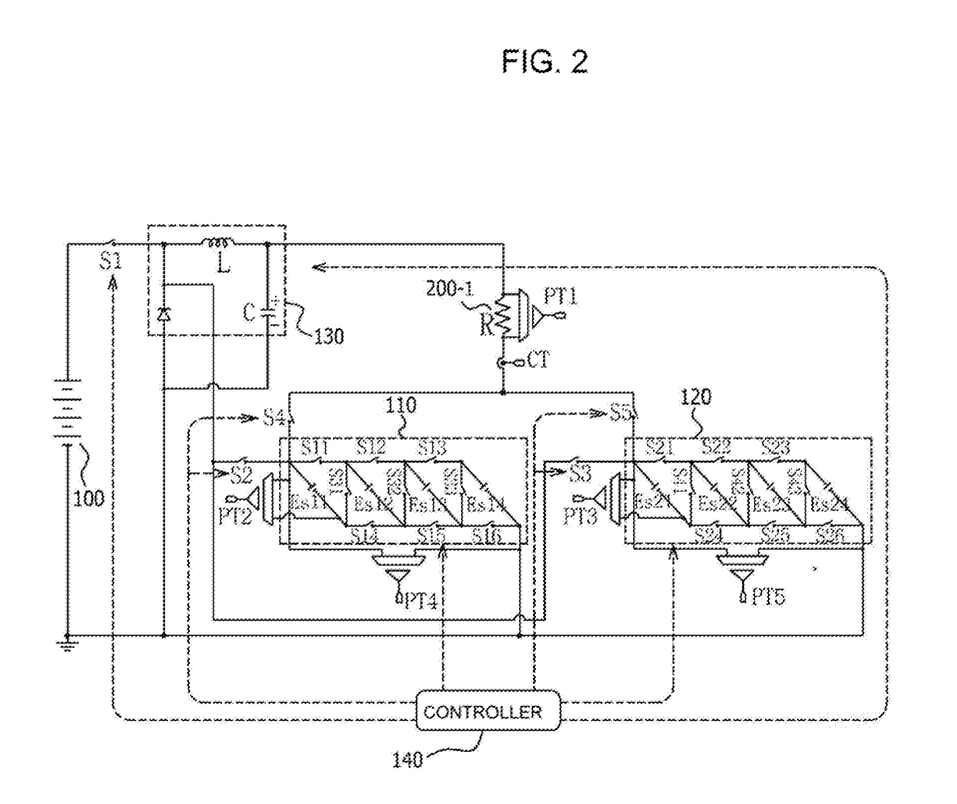
FIG. 2 is a view illustrating the structure of a load current regenerating circuit according to a first embodiment of the present invention.
Figure 3:
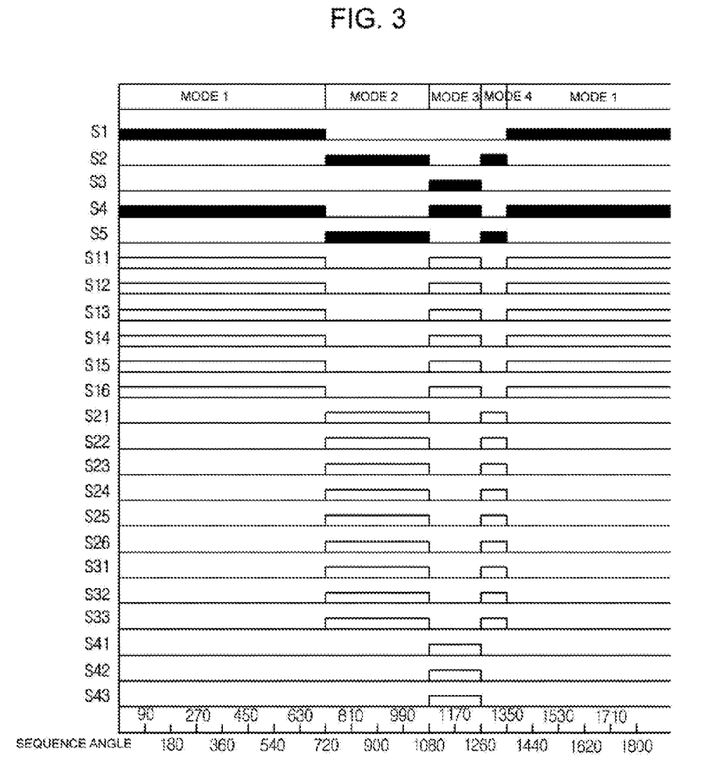
FIG. 3 is a view illustrating switching operation sequences of the load current regenerating circuit of FIG. 2 according to each operation mode shown in Table 1.

FIG. 2 is a view illustrating the structure of a load current regenerating circuit according to a first embodiment of the present invention, and FIG. 3 is a view illustrating switching operation sequences of the load current regenerating circuit of FIG. 2 according to each operation mode shown in Table 1.

Now described is an operational principle of a load current regenerating circuit with reference to FIGS. 2 and 3, according to an embodiment of the present invention. In an embodiment of the present invention, it may be preferable to perform operation mode 2, operation mode 3, and operation mode 4 after operation mode 1 in which the power source 100 applies power, like in the order of "operation mode 1→operation mode 2→operation mode 3→operation mode 4 . . . ."

Meanwhile, operation mode 1 for operating the load current regenerating circuit shown in FIG. 2 is a charge-linked direct current (DC) application mode, and as shown in Table 1 and FIG. 3, among the switches shown in FIG. 2, switches S1, S4, S11, S12, S13, S14, S15, and S16 are shorted while the other switches are opened in operation mode 1. Accordingly, the power source 100 applies a current to a load 200-1 to operate the load 200-1, and the load current operating the load 200-1 is regenerated and recharged to the first circuit unit 110 along a short circuit path of select switches.

Operation mode 2 is the charge-linked discharge mode I in which among the switches of the first circuit unit 110, switches S2, S31, S32, and S33 are shorted to create a series path for recharging elements Es11, Es12, Es13, and Es14, and to operate the load 200-1 with energy boosted and discharged from the recharging elements Es11, Es12, Es13, and Es14 along the series path, and then, among the switches of the second circuit unit 120, switches S5, S21, S22, S23, S24, S25, and S26 are shorted to create parallel paths for recharging elements Es21, Es22, Es23, and Es24 and to regeneratively recharge the recharging elements Es21, Es22, Es23, and Es24 along the parallel paths.

In this mode, the other switches than the shorted switches are opened, and energy is recycled in a positive-to-positive energy exchanging manner using a seesaw electric potential difference that occurs between a voltage step-up discharge at the first circuit unit 110 and a voltage step-down charge at the second circuit unit 120.

Operation mode 3 is the charge-linked discharge mode II in which among the switches of the second circuit unit 120, switches S3, S41, S42, and S43 are shorted to create a series path for the recharging elements Es21, Es22, Es23, and Es24 and to operate the load 200-1 with energy boosted and discharged from the recharging elements Es21, Es22, Es23, and Es24 along the series path, and then, among the switches of the first circuit unit 110, switches S4, S11, S12, S13, S14, S15, and S16 are shorted to create parallel paths for recharging elements Es11, Es12, Es13, and Es14 and to regeneratively recharge the recharging elements Es11, Es12, Es13, and Es14 along the parallel paths.

In this mode, the other switches than the shorted switches are opened, and energy is recycled in a positive-to-positive energy exchanging manner using a seesaw electric potential difference that occurs between a voltage step-up discharge at the second circuit unit 120 and a voltage step-down charge at the first circuit unit 110.

Operation mode 4 is the charge-linked discharge mode III in which among the switches of the first circuit unit 110, switches S2, S31, S32, and S33 are shorted to create a series path for the recharging elements Es11, Es12, Es13, and Es14 and to operate the load 200-1 with energy boosted and discharged from the recharging elements Es11, Es12, Es13, and Es14 along the series path, and then, among the switches of the second circuit unit 120, switches S5, S21, S22, S23, S24, S25, and S26 are shorted to create parallel paths for the recharging elements Es21, Es22, Es23, and Es24 and to regeneratively recharge the recharging elements Es21, Es22, Es23, and Es24 along the parallel paths. This mode is operated in the same way as operation mode 2 to recycle energy.

In other words, according to an embodiment of the present invention, the load current regenerating circuit shown in FIG. 2 includes the first circuit unit 110, the second circuit unit 120, a first switching unit S1, a second switching unit S2, a third switching unit S5, S21, S22, S23, S24, S25, S26, S31, S32, and S33, a fourth switching unit S4, S11, S12, S13, S14, S15, S16, S41, S42, and S43, and a fifth switching unit S3.

First, the first circuit unit 110 includes a first recharging unit having a plurality of recharging elements connected in parallel with one another and recharged by the power source 100, and the second circuit unit 120 includes a second recharging unit. The second circuit unit 120 is provided in parallel with the first circuit unit 110.

Meanwhile, when the first switching unit S1 is shorted, the first recharging unit is recharged by the power source 100 (operation mode 1).

Meanwhile, in case the first recharging unit is completely recharged, the first switching unit S1 is opened to disconnect the first circuit unit 110 from the power source 100. Upon completion of recharging the first recharging unit, the second switching unit S2 is shorted so that the power recharged to the first recharging unit is supplied to the second circuit unit 120, recharging the second recharging unit having the plurality of recharging elements connected in parallel. Simultaneously, the third switching unit S5, S21. S22, S23, S24, S25, S26, S31. S32, and S33 is shorted to allow the plurality of recharging elements of the first recharging unit to be connected in series, so that the second recharging unit is recharged (operation mode 2).

In case the second recharging unit is recharged by the first recharging unit, the fourth switching unit S4, S11, S12, S13, S14, S15, S16, S41, S42, and S43 is switched to allow the plurality of recharging elements of the second recharging unit to be connected in series. Simultaneously, the fifth switching unit S3 is operated to connect the second recharging unit with the first recharging unit, so that the power recharged to the second recharging unit is supplied to the first circuit unit 110, recharging the first recharging unit having the multiple recharging elements connected in parallel (operation mode 3).

Upon completion of recharging the first recharging unit, the second switching unit S2 is shorted so that the power recharged to the first recharging unit is supplied to the second circuit unit 120, recharging the second recharging unit having the plurality of recharging elements connected in parallel. Simultaneously, the third switching unit S5, S21, S22, S23, S24, S25, S26, S31, S32, and S33 is shorted to allow the plurality of recharging elements of the first recharging unit to be connected in series, so that the second recharging unit is recharged (operation mode 4). Here, operation mode 4 is operated in the same way as operation mode 2.

Summarizing the operation modes, the switching units are operated by the controller 140, e.g., in the order of "operation mode 1→operation mode 2→operation mode 3→operation mode 4→operation mode 1 . . . ." An ideal control sequence is to repeat some operation modes in the order of "operation mode 2→operation mode 3→operation mode 2→operation mode 3" to thereby raise energy efficiency, but such unlimited repetitive operation is difficult to expect due to switching loss, copper loss, iron loss, Eddy currents, or other losses.

When the load 200-1 is operated in the order of "operation mode 1→operation mode 2→operation mode 3→operation mode 4," the load 200-1 cannot be fed with a constant current due to a gradual voltage drop.

Therefore, there is a need of a constant voltage control circuit or a current and voltage control circuit 130 for keeping the current flowing through the load 200-1 constant in order to supply a constant current to the load 200-1. Here, the current and voltage control circuit 130 is a circuit that varies current or keeps current constant by varying voltage, and the current and voltage control circuit 130 includes a non-isolated type converter or an isolated type converter.

An operational principle of a load current regenerating circuit according to an embodiment of the present invention is now described in greater detail with reference to FIG. 2.

According to the present invention, the load current regenerating circuit refers to a circuit that stores the energy used to operate the load 200-1 in recharging-discharging elements and discharges the stored energy to re-operate the load 200-1. The load current regenerating circuit is fed back with a voltage recharged to the first recharging unit of the first circuit unit 110 and a voltage discharged from the first discharging unit and a voltage recharged to the second recharging unit of the second circuit unit 120 and a voltage discharged from the second discharging unit and operates the switching units, e.g., in the order of "operation mode 1→operation mode 2→operation mode 3→operation mode 4→operation mode 1 . . . ."

FIG. 2 is a view illustrating the structure of a load current regenerating circuit according to an embodiment of the present invention, and FIG. 3 is a view illustrating switching operation sequences of the load current regenerating circuit of FIG. 2 according to each operation mode shown in Table 1.

The structure of a load current regenerating circuit according to an embodiment of the present invention is described with reference to FIGS. 2 and 3. The load current regenerating circuit includes the first circuit unit 110 and the second circuit unit 120. The first circuit unit 110 includes the first recharging unit, the first discharging unit, and multiple first recharging-discharging elements connected in parallel with one another.

The second circuit unit 120 provided in parallel with the first circuit unit 110 includes the second recharging unit, the second discharging unit, and multiple second recharging-discharging elements connected in parallel with one another.

The first recharging unit includes switches for switching to recharge, S1, S4, S11, S12, S13, S14, S15, and S16. The first recharging-discharging elements include elements Es11, Es12, Es13, and Es14 connected in parallel with one another. The first discharging unit includes switches for switching to discharge, S2, S31, S32, and S33.

The second recharging unit includes switches for switching to recharge, S1, S5, S21, S22, S23, S24, S25, and S26. The second recharging-discharging elements include elements Es21, Es22, Es23, and Es24 connected in parallel with one another. The second discharging unit includes switches for switching to discharge, S3, S41, S42, and S43.

According to an embodiment of the present invention, the operation mode switches, like in the order of "operation mode 1→operation mode 2→operation mode 3→operation mode 4," are made by the controller 140 receiving voltages detected by voltage sensors PT1, PT2, PT3, PT4, and PT5 and a current detected by a current sensor CT.

Meanwhile, as shown in FIG. 3, operation mode 1 is a main power application mode in which among the switches shown in FIG. 2, the switches for switching to recharge, S1, S4, S11, S12, S13, S14, S15, and S16, of the first recharging unit in the first circuit unit 110 are shorted while the other switches are opened. Accordingly, the power source 100 inputs main power to operate the load 200-1.

More specifically, the switches for switching to recharge of the first switching unit S1 and the third switching unit S4, S11, S12, S13, S14, S15, and S16 are shorted so that the power source 100 recharges main power to the first recharging-discharging elements Es11, Es12, Es13, and Es14.

Operation mode 2 is the charge-linked discharge mode I in which the switches for switching to recharge of the first recharging unit S1, S4, S11, S12, S13, S14, S15, and S16 of the first circuit unit 110 are opened, and the switches for switching to discharge of the first discharging unit S2, S31, S32, and S33 are shorted so that the energy stored in the first recharging-discharging elements Es11, Es12, Es13, and Es14 operates the load 200-1 along the switches for switching to discharge of the first discharging unit S2, S31, S32, and S33, and then the switches for switching to recharge of the second recharging unit S5, S21, S22, S23, S24, S25, and S26 of the second circuit unit 120 are shorted and the switches for switching to discharge, S3, S41, S42, and S43, are opened so that energy-exchanged recharge is performed from the first recharging-discharging elements Es11, Es12, Es13, and Es14 to the second recharging-discharging elements Es21, Es22, Es23, and Es24 via the load 200-1.

More specifically, the third switching unit S5, S21, S22, S23, S24, S25, S26, S2, S31, S32, and S33 are shorted to recharge the first recharging-discharging elements Es21, Es22, Es23, and Es24 with the load current used to operate the load.

Operation mode 3 is the charge-linked discharge mode 11 in which the switches for switching to recharge of the second recharging unit S5, S21, S22, S23, S24, S25, and S26 of the second circuit unit 120 are opened, and the switches for switching to discharge of the second discharging unit S3, S41, S42, and S43 are shorted so that the energy stored in the second recharging-discharging elements Es21, Es22, Es23, and Es24 operate the load 200-1 along the switches for switching to discharge of the second discharging unit S3, S41, S42, and S43, and then the switches for switching to recharge of the first recharging unit S4, S11, S12, S13, S14, S15, and S16 of the first circuit unit 110 are shorted and the switches for switching to discharge, S2, S31, S32, and S33, are opened so that energy-exchanged recharge is performed from the second recharging-discharging elements Es21, Es22, Es23, and Es24 to the first recharging-discharging elements Es11, Es12, Es13, and Es14 via the load 200-1.

More specifically, the fourth switching unit S4, S11, S12, S13, S14, S15, S16, S41, S42, and S43 and the fifth switching unit S3 are shorted to recharge the first recharging-discharging elements Es11, Es12, Es13, and Es14 with the load current used to operate the load.

Operation mode 4 is a charge-linked discharge mode III in which an energy recycling operation is performed in the same way as operation mode 2.

However, when energy discharge occurs in operation mode 2, operation mode 3, and operation mode 4, the voltage gradually drops, rendering it difficult to constantly supply current to the load 200-1.

Accordingly, the load 200-1 is operated with a constant current output by pulse-width-modulation (PWM) controlling the current and voltage control circuit 130, the first switching unit S1, the second switching unit S2, and the fifth switching unit S3.

The current and voltage control circuit 130 includes a voltage step-up current control circuit that steps up voltage to output a constant current, a voltage step-down current control circuit that steps down voltage to output a constant current, or a voltage step-up/step-down current control circuit.

The recharging-discharging elements refer to secondary batteries or high-capacitance capacitors, and the load 200-1 includes an R load and an RL series circuit load.

The R load includes an illumination load, an electrothermal load, a signal load, or a display load, and the RL series circuit load refers to a magnetic circuit load, such as a motor, a transformer, or a switched-reluctance motor, as used to vary a torque output or voltage.

Figure 4:
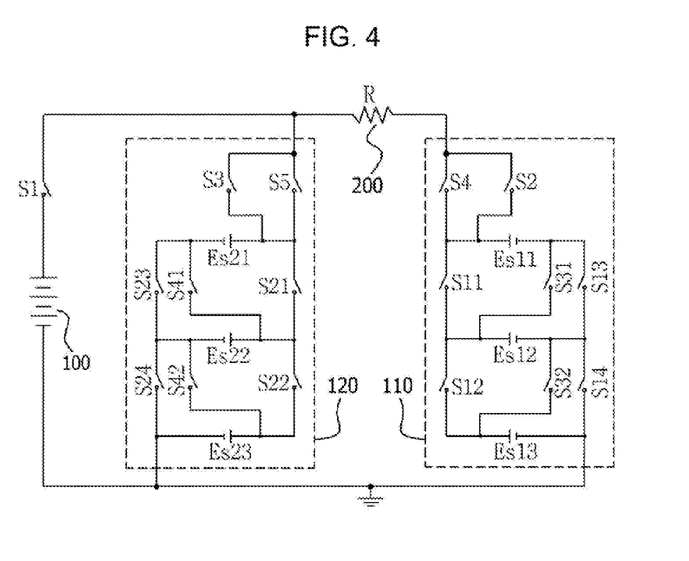
FIG. 4 is a view illustrating the structure of a load current regenerating circuit according to a second embodiment of the present invention.
Figure 5:
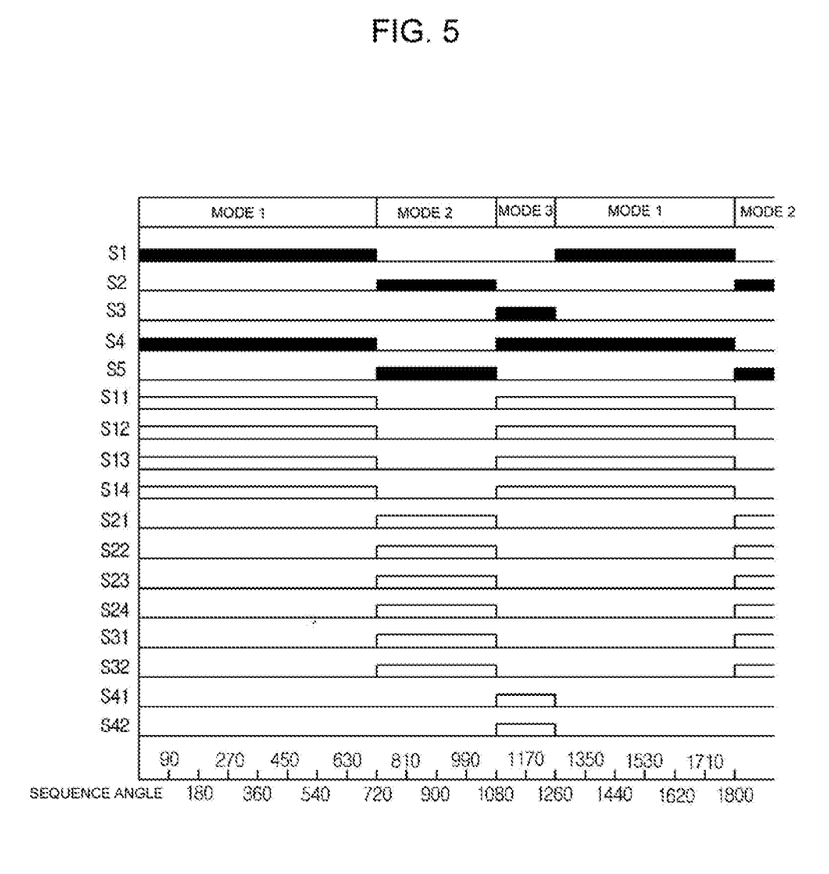
FIG. 5 is a view illustrating switching operation sequences of the load current regenerating circuit of FIG. 4.

FIG. 4 is a view illustrating the structure of a load current regenerating circuit according to a second embodiment of the present invention, and FIG. 5 is a view illustrating switching operation sequences of the load current regenerating circuit of FIG. 4.

The second embodiment of the present invention is described with reference to FIGS. 4 and 5. The load current regenerating circuit includes, between both ends of a load, the first circuit unit 110, the second circuit unit 120, a first switching unit S1, a second switching unit S2, a third switching unit S5, S21, S22, S23, S24, S31, and S32, a fourth switching unit S4, S11, S12, S13, S14, S42, and S43, and a fifth switching unit S3.

First, the first circuit unit 110 includes a first recharging unit having a plurality of recharging elements connected in parallel with one another and recharged by the power source 100, and the second circuit unit 120 includes a second recharging unit. The second circuit unit 120 is provided in parallel with the first circuit unit 110.

Meanwhile, when the first switching unit S1 is shorted, the first recharging unit is charged by the power source 100 (operation mode 1).

Meanwhile, in case the first recharging unit is completely recharged, the first switching unit S1 is opened to disconnect the first circuit unit 110 from the power source 100. Upon completion of recharging the first recharging unit, the second switching unit S2 is shorted so that the power recharged to the first recharging unit is supplied to the second circuit unit 120, recharging the second recharging unit having the plurality of recharging elements connected in parallel. Simultaneously, the third switching unit S5, S21, S22, S23, S24, S25, S26, S31, S32, and S33 is shorted to allow the plurality of recharging elements of the first recharging unit to be connected in series, so that the second recharging unit is recharged (operation mode 2).

In case the second recharging unit is recharged by the first recharging unit, the fourth switching unit S4, S11, S12, S13, S14, S41, and S42 is switched to allow the plurality of recharging elements of the second recharging unit to be connected in series. Simultaneously, the fifth switching unit S3 is operated to connect the second recharging unit with the first recharging unit, so that the power recharged to the second recharging unit is supplied to the first circuit unit 110, recharging the first recharging unit having the multiple recharging elements connected in parallel (operation mode 3).

Summarizing the operation shown in FIG. 4 by referring to FIG. 5, the switching units are operated, e.g., in the order of "operation mode 1→operation mode 2→operation mode 3→operation mode 1." A difference between FIG. 2 and FIG. 4 lies in that the first circuit unit 110 and the second circuit unit 120 are connected to the lower end of the load in FIG. 2 while the first circuit unit 110 and the second circuit unit 120 are connected to both ends of the load in FIG. 4.

A load current regenerating circuit according to the present invention may have various circuit configurations, such as a direct load connected configuration in which the first circuit unit 110 and the second circuit unit 120 are directly connected to the load (FIGS. 2 and 4), an indirect load connected configuration in which the first circuit unit 110 and the second circuit unit 120 are connected to an inverter or converter for operating the load (FIG. 6), and a direct-indirect mixed configuration in which the first circuit unit 110 and the second circuit unit 120 are connected to the primary winding of a transformer and the first circuit unit 110 and the second circuit unit 120 are connected to the secondary winding of the transformer.

Figure 6:
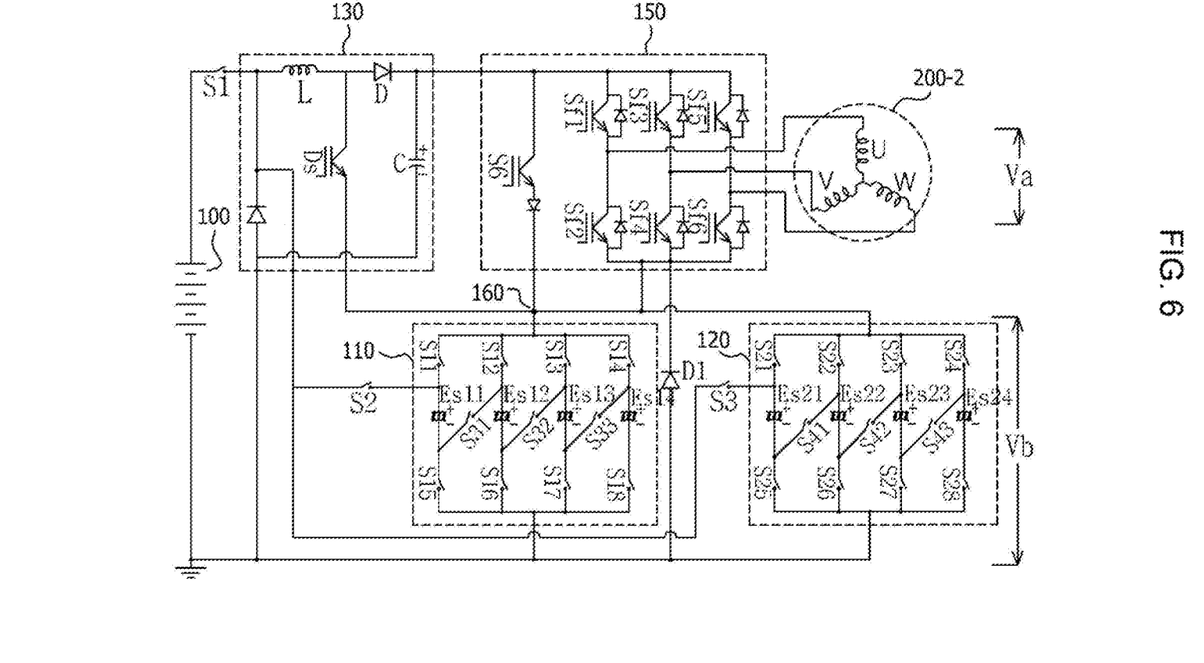
FIG. 6 is a view illustrating the structure of a load current regenerating circuit connected to an inverter according to a third embodiment of the present invention.

FIG. 6 is a view illustrating the structure of a load current regenerating circuit connected to an inverter, which corresponds to the above-mentioned indirect load connected configuration, according to a third embodiment of the present invention.

The third embodiment of the present invention is described with reference to FIGS. 3 and 6. An inverter 150 operating an RL load 200-2 includes the first circuit unit 110, the second circuit unit 120, a first switching unit S1, a second switching unit S2, a third switching unit S21, S22, S23, S24, S25, S26, S27, S28, S31, S32, and S33, a fourth switching unit S1, S12, S13, S14, S15, S16, S17, S18, S41, S42, and S43, and a fifth switching unit S3, and further includes the current and voltage control circuit 130 for controlling torque and speed.

First, the first circuit unit 110 includes a first recharging unit having a plurality of recharging elements connected in parallel with one another and recharged by the power source 100, and the second circuit unit 120 includes a second recharging unit. The second circuit unit 120 is provided in parallel with the first circuit unit 110.

Meanwhile, when the first switching unit S1 is shorted, the first recharging unit is recharged by the power source 100 (operation mode 1).

Meanwhile, in case the first recharging unit is completely recharged, the first switching unit S1 is opened to disconnect the first circuit unit 110 from the power source 100. Upon completion of recharging the first recharging unit, the second switching unit S2 is shorted so that the power recharged to the first recharging unit is supplied to the second circuit unit 120, recharging the second recharging unit having the plurality of recharging elements connected in parallel. Simultaneously, the third switching unit S21, S22, S23, S24, S25, S26, S27, S28, S31, S32, and S33 is shorted to allow the plurality of recharging elements of the first recharging unit to be connected in series, so that the second recharging unit is recharged (operation mode 2).

In case the second recharging unit is recharged by the first recharging unit, the fourth switching unit S11, S12, S13, S14, S15, S16, S17, S18, S41, S42, and S43 is switched to allow the plurality of recharging elements of the second recharging unit to be connected in series. Simultaneously, the fifth switching unit S3 is operated to connect the second recharging unit with the first recharging unit, so that the power recharged to the second recharging unit is supplied to the first circuit unit 110, recharging the first recharging unit having the multiple recharging elements connected in parallel (operation mode 3).

Here, operation mode 4 is operated in the same way as operation mode 2. Upon completion of recharging the first recharging unit, the second switching unit S2 is shorted so that the power recharged to the first recharging unit is supplied to the second circuit unit 120, recharging the second recharging unit having the plurality of recharging elements connected in parallel. Simultaneously, the third switching unit S21, S22, S23, S24, S25, S26, S27, S28, S31, S32, and S33 is shorted to allow the plurality of recharging elements of the first recharging unit to be connected in series, so that the second recharging unit is recharged (operation mode 4).

A voltage-converted current that flows and dissipates to the negative electrode of the power source through the switch Ds of the current and voltage control circuit 130 is regenerated in the first circuit unit 110 and the second circuit unit 120 via a connection node 160.

As such, the load current regenerating circuit having the first circuit unit 110 and the second circuit unit 120 connected with an inverter or converter is operated in the order of "operation mode 1→operation mode 2→operation mode 3→operation mode 4→operation mode 1 . . . " to regenerate the dissipated current. In other words, the operation of the load current regenerating circuit shown in FIG. 6 is the same as what has been described above in connection with FIG. 2.

That is, the circuit shown in FIG. 6 is a load current regenerating circuit connected in series with an inverter and/or converter operating an RL series circuit load. The RL series circuit load, unlike the R load shown in FIG. 2, is primarily used in an alternating current (AC) circuit, and thus, when directly connected with the RL series circuit load, the load current regenerating circuit stops operation.

Therefore, the RL series circuit load (e.g., a single or three-phase motor or a transformer magnetic circuit) is connected with the load current regenerating circuit via a phase change switch-equipped inverter or a frequency change switch-equipped converter.

Referring to FIG. 6, according to another embodiment of the present invention, the load current regenerating circuit connected in series with an inverter and/or a converter for operating the RL series circuit load is configured so that the load current regenerating circuit including a first circuit unit 110 and a second circuit unit 120 is connected in series with a lower end or both ends of an inverter 150 and/or a converter having a free-wheeling circuit for regenerating energy used to operate an RL series circuit load 200-2 such as a motor or a transformer, and is configured to include a controller that control the inverter 150 and/or converter and a constant current and voltage control circuit 130 that may vary voltage for changing speed and voltage.

The free-wheeling circuit of the inverter 150 and/or converter is a circuit that includes a switch S6 and a diode D1 and that induces a path to recharge with counter-flowing energy by a regenerative brake or discharge in the RL series circuit and prevents a phase change switch or frequency change switch.

The load current regenerating circuit shown in FIG. 2 is configured as an impedance matching series-parallel circuit, and the load current regenerating circuit shown in FIG. 4 is configured as a common series-parallel circuit.

In order to regenerate a load current using the load current regenerating circuit shown in FIG. 6, the load current regenerating circuit is connected in series with the load 200-2 and the inverter 150 and/or converter for operating the load 200-2 to configure a dual series direct-current (DC) circuit, and a load operation voltage Va and a load current regenerating circuit operation voltage Vb are applied to regenerate the load current while simultaneously enhancing power factor.

Here, the inverter is a device that converts DC to AC and is used in, e.g., a motor, a transformer, or a high-voltage generator. The converter refers to not only an AC-to-DC converting device but also a DC-to-DC converting device or a switched reluctance motor (SRM) actuating circuit.

Figure 7:
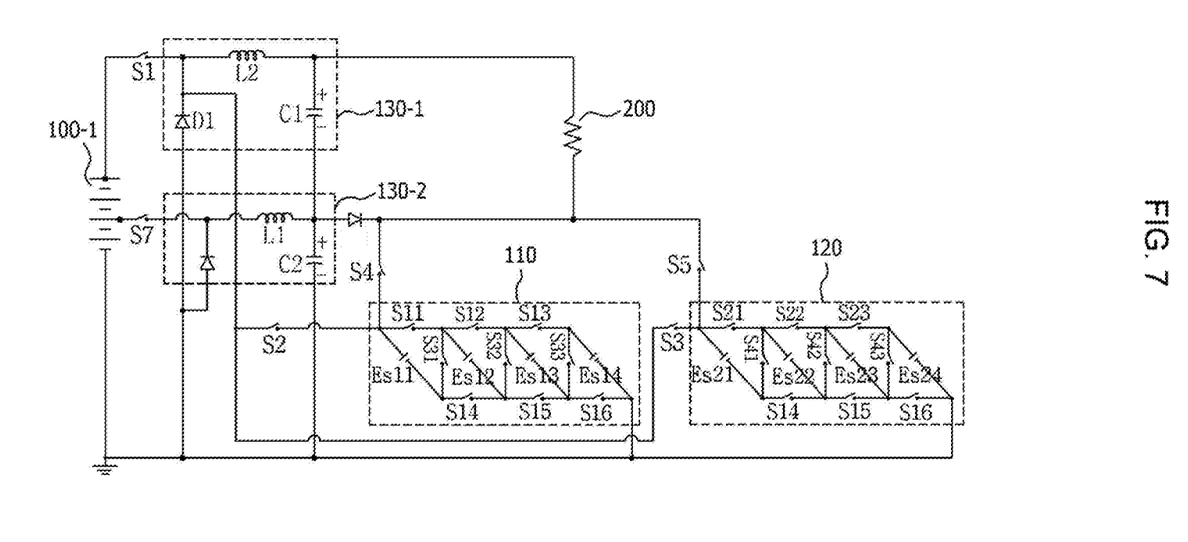
FIG. 7 is a view illustrating the structure of a two-step voltage source load current regenerating circuit according to a fourth embodiment of the present invention.

FIG. 7 is a view illustrating the structure of a two-step voltage source load current regenerating circuit, where a two-step voltage source is used to adjust a recharge-discharge time balance.

Referring to FIG. 7, the load current regenerating circuit includes a two-step voltage source 100-1, two current and voltage control circuits 130-1 and 130-2, a load 200, a first circuit unit 110, and a second circuit unit 120. The load current regenerating circuit has a switch S7 to easily control the two-step voltage source to supply two separate voltages. In other words, the load current regenerating circuit shown in FIG. 7 may vary a DC voltage as necessary to control the operation of the load and recharging-discharging elements.

Further, the load current regenerating circuit shown in FIG. 7 adjusts a recharge-discharge time balance with the main power source. In other words, the load current regenerating circuit of FIG. 7 may be said to be a dual power source circuit that may apply a full voltage or a half voltage as necessary to increase the efficiency of the main power source.

In particular, adding a tab voltage applying type load current regenerating circuit as shown in FIG. 7 to an RL series circuit as shown in FIG. 6 might subject a motor or transformer to a two-step control of low speed and high speed or low voltage and high voltage. An operation of the two-step voltage source load current regenerating circuit of FIG. 7 is the same as what has been described above in connection with FIG. 2.

Although the present invention has been shown and described in connection with preferred embodiments thereof, it should be appreciated by one of ordinary skill in the art that the present invention is not limited thereto and that various changes and modifications may be made thereto without departing from the scope of the present invention defined in the following claims, and such modifications should not be interpreted individually from the technical spirit or scope of the present invention.

The terms as used herein are provided merely to describe some embodiments thereof but not to limit the present invention. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

The present invention has industrial availability in electricity or electronics-linked industry.

What is claimed is:

1. A load current regenerating circuit, comprising:
a first circuit unit having a first recharging unit recharged by a power source;
a second circuit unit provided in parallel with the first circuit unit, the second circuit unit having a second recharging unit;
a first switching unit opening a connection between the power source and the first circuit unit when the first recharging unit is recharged; and
a second switching unit connecting the first recharging unit with the second recharging unit when the first recharging unit is recharged so that power recharged to the first recharging unit is supplied to the second circuit unit to recharge the second recharging unit.

2. The load current regenerating circuit of claim 1, wherein the first recharging unit includes a plurality of recharging elements connected in parallel with one another, the load current regenerating circuit further comprising a third switching unit performing a switch so that the plurality of recharging elements are connected in series with one another when the first recharging unit is recharged.

3. The load current regenerating circuit of claim 2, wherein the second recharging unit includes a plurality of recharging elements, the load current regenerating circuit further comprising a fourth switching unit performing a switch so that the plurality of recharging elements of the second recharging unit are connected in series with one another when the second recharging unit is recharged by the first recharging unit, and wherein when the second recharging unit is recharged by the first recharging unit, the third switching unit performs a switch so that the plurality of recharging elements of the first switching unit are connected in parallel with one another.

4. The load current regenerating circuit of claim 3, further comprising a fifth switching unit connecting the second recharging unit with the first recharging unit when the second recharging unit is recharged by the first recharging unit so that the power recharged to the second recharging unit is supplied to the first circuit unit to recharge the first recharging unit.

5. The load current regenerating circuit of claim 1, further comprising a load connected in series with each of the first circuit unit and the second circuit unit.

6. The load current regenerating circuit of claim 5 wherein the load is an RL load.

7. The load current regenerating circuit of claim 5, further comprising a current and voltage control circuit for keeping a current applied to the load constant.

8. The load current regenerating circuit of claim 1, further comprising an inverter or a converter connected in series with each of the first circuit unit and the second circuit unit.

9. An electrical device including a load current regenerating circuit, the load current regenerating circuit, comprising:
a first circuit unit having a first recharging unit recharged by a power source;
a second circuit unit provided in parallel with the first circuit unit, the second circuit unit having a second recharging unit;
a first switching unit opening a connection between the power source and the first circuit unit when the first recharging unit is recharged; and
a second switching unit connecting the first recharging unit with the second recharging unit when the first recharging unit is recharged so that power recharged to the first recharging unit is supplied to the second circuit unit to recharge the second recharging unit.

* * * * *